Feb. 25, 1936. L. E. MALLORY ET AL 2,032,140
FILTER DEVICE
Filed Oct. 21, 1933 2 Sheets-Sheet 1

Inventors
Lewis E. Mallory
Joseph T. Nash
By Shreve, Crowe & Gordon
Attorneys

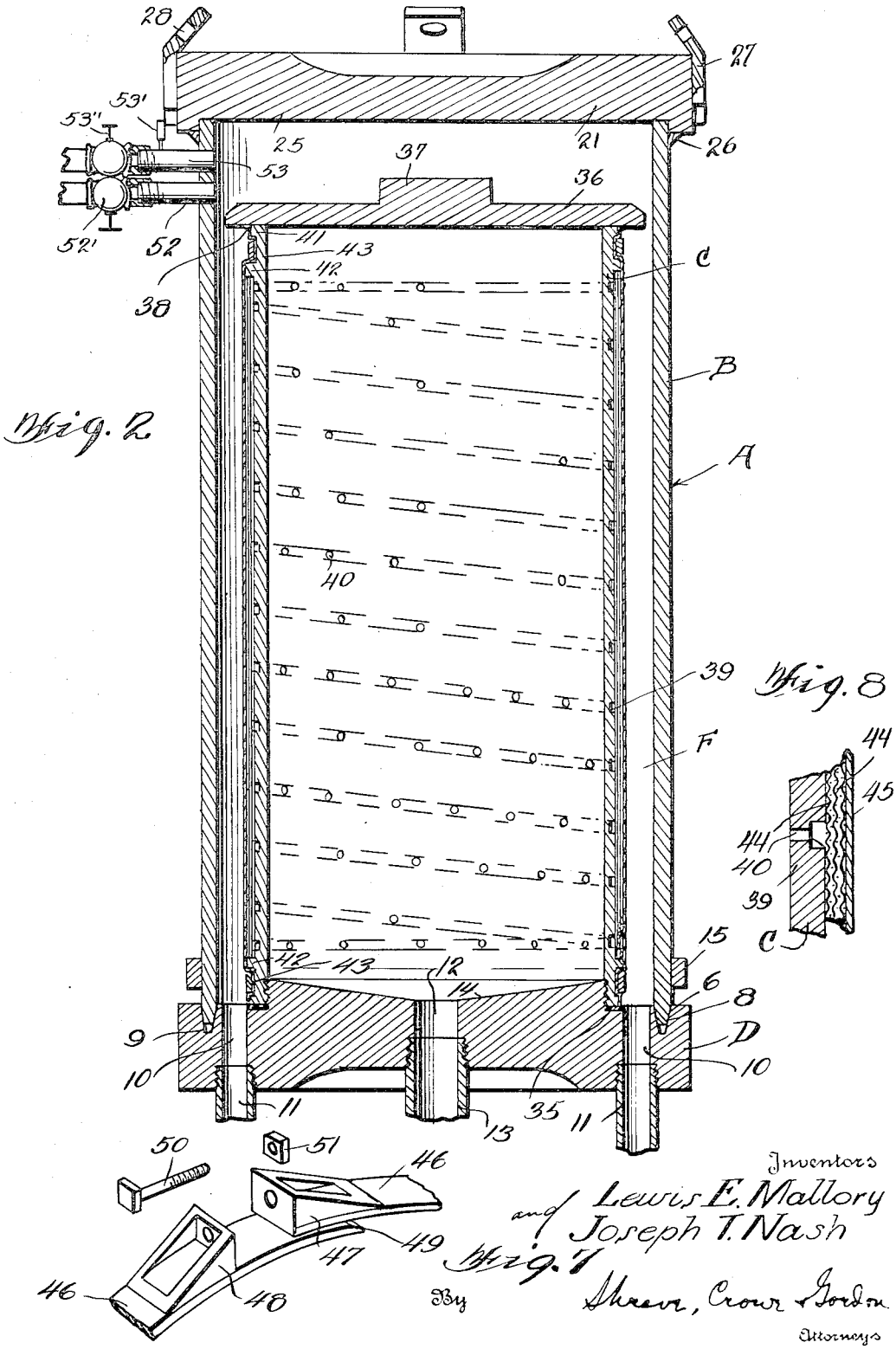

Patented Feb. 25, 1936

2,032,140

UNITED STATES PATENT OFFICE 2,032,140

FILTER DEVICE

Lewis E. Mallory and Joseph T. Nash, Decatur, Ga.

Application October 21, 1933, Serial No. 694,668

4 Claims. (Cl. 210—183)

Generically this invention relates to filters, but it is more especially directed to the type adapted for filtering oils and the like, and so constructed as to permit the expeditious removal of the filter cake therefrom.

One of the principal objects of this invention is the provision of a filtering device for filtering crankcase, animal, vegetable, and mineral oils, as well as dewatering collodial or crystalline substances, such as clays, sugar, chemicals, and the like, under pressure.

Another important object of this invention is the provision of a filtering device comprising two concentric cylinders spaced to provide an annular chamber adapted to contain the suspended matter or filter cake, means for effecting drying of the cake, and means for expeditiously removing the outer cylinder to expose said matter or cake to effect its ready removal and without material wear or damage to the filtering surface.

A further important object of this invention is the provision of a filtering device of this character comprising two telescopically arranged cylinders spaced to form a suspended matter collecting chamber, so designed that notwithstanding high compression in said chamber thin cylinder walls may be employed, and means for expeditiously removing the outer cylinder without disturbing the filter cake or contaminating the filtrate section with unfiltered stock, permitting ready replacement of the filter material as desired, and adapted to effect cleaning of the filter material by a reversal of the compression force.

Another object of this invention is the provision of a filtering device of this character comprising a stationary cylinder and an outer removable cylinder telescopically arranged in spaced relation with respect to said inner cylinder to form an oil compression and suspended matter collecting chamber, and unique means for filtering and directing the filtered product into said inner cylinder by the compression in said chamber.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 2 is a vertical cross sectional view.

Fig. 7 is a fragmentary view of the filter material clamping bands showing the adjustable securing means.

Fig. 8 is an enlarged detail view of a portion of the inner cylinder wall and layers of screen and filter material.

Figure 1:
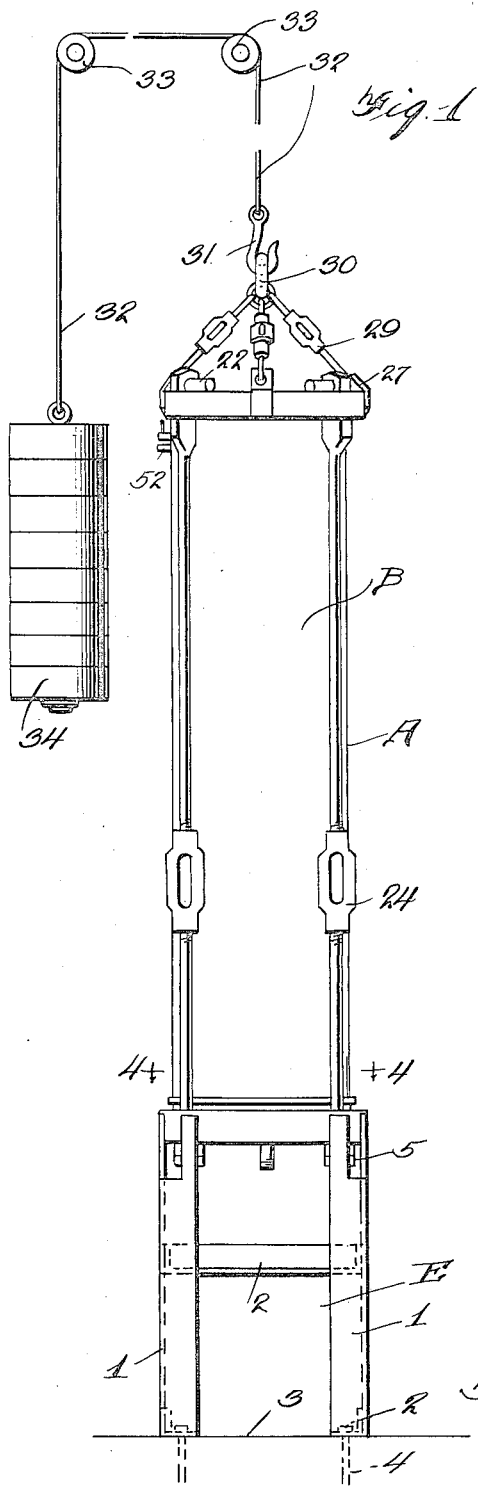
Fig. 1 is a front elevation of our improved filter device and supporting base.
Figure 3:
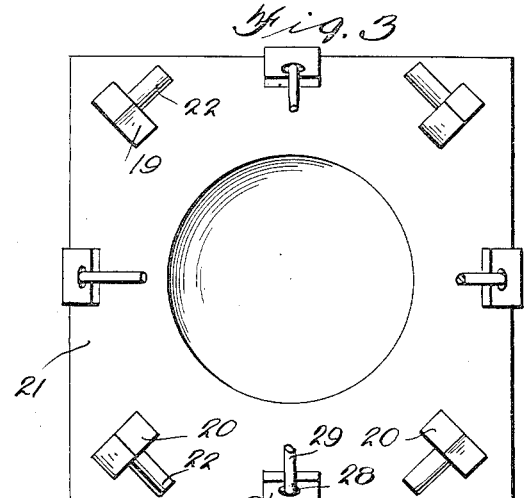
Fig. 3 is a top plan view partly in section taken on the line 3—3 of Fig. 1.
Figure 4:
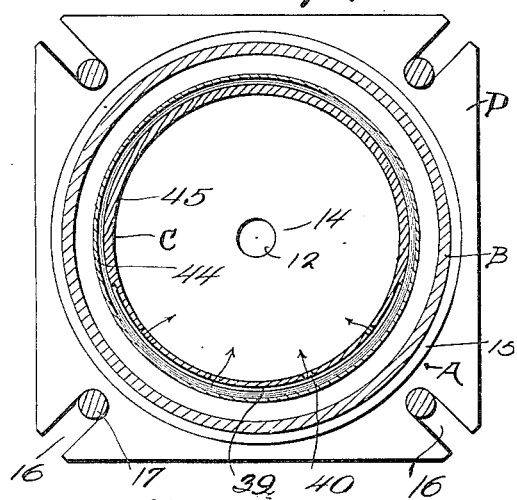
Fig. 4 is a cross section taken on the line 4—4 of Fig. 1.
Figure 5:
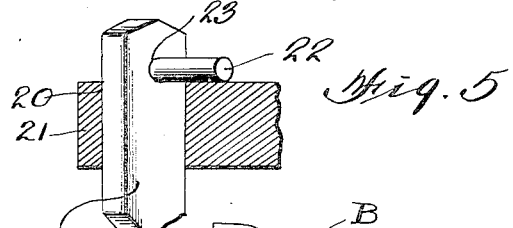
Fig. 5 is a fragmentary detail view of the connection of one of the turn-buckle rods and outer cylinder top plate.
Figure 6:
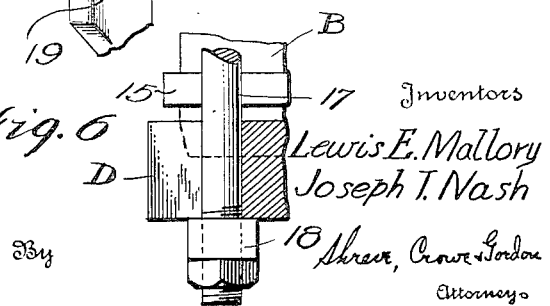
Fig. 6 is a detail fragmentary view of the connection of the lower end of said turnbuckle rod with the bottom or base plate.

The devices of this general character with which we are familiar have proven deficient in many respects, including complex structures, costly to manufacture, necessitating thick walls, rendering it difficult to effect quick drying of the filter cake as well as its removal without wear and damage to the filtering surface and without contaminating the filtered material, and it was to overcome such disadvantages by providing a filtering device comprising a stationary inner cylinder having a filter material applied thereto and constituting a filtrate containing chamber, and an outer removable cylinder telescopically arranged in spaced and sealing relation with respect to said inner cylinder to form an oil receiving and suspended matter collecting chamber, and means for expeditiously removing said outer cylinder to effect ready removal of the filter cake as well as changing or replacing the filter material without disturbing the inner cylinder or contaminating the filtrate, and means for effecting drying of the filter cake and cleaning of the filter material by application of hot air, steam and the like under pressure, without dismantling of the device, that we designed the device forming the subject matter of this invention.

In the illustrated embodiment characterizing this invention there is shown a filtering device A comprising a removable outer cylinder B, an inner stationary filtrate cylinder C, a base plate D, and a supporting stand E.

The stand E, in the present instance, is formed with four angle iron supports or legs 1 connected at their lower ends by angle side plates 2 bolted, welded or otherwise suitably secured thereto and rigidly secured to floor 3 by bolts 4. Said legs 1 are similarly connected and braced by similar side plates 2 at a point spaced from their upper ends. Each of the legs 1 is formed at its upper end with a recess or slot 5 for a purpose hereinafter more fully appearing.

Mounted on the stand E secured thereto by bolts, welding, or in any suitable manner is the substantially square base or bottom plate D formed with a countersunk portion 6, the annular wall 7 of which is threaded for engagement with the threaded lower end of cylinder C to form a positive and non-leakable connection when said cylinder is operatively mounted thereon. The base plate D not only forms a bottom for cylinder C but also for cylinder B and the annular compression chamber F formed intermediate said cylinders when cylinder B is telescopically positioned over cylinder C with its lower tapered edge 8 operatively seated in the annular V-shaped recess 9 formed in the face of the countersunk portion 6 and forming a seal connection between said cylinder B and base plate D.

Said base plate D is formed with opposite openings 10 communicating with chamber F and having their lower ends threaded to receive the threaded ends of inlet pipes or conduits 11 through which oil or other fluids to be filtered are introduced into chamber F under pressure as directly more fully appearing. A centrally disposed outlet opening 12 for cylinder C is formed in base D in which is threadedly connected an outlet conduit or pipe 13 for directing the filtered product or filtrate from cylinder C. The surface 14 of base D forming the bottom of said cylinder is inclined downwardly from its circumferential edge to center opening 12 in order to effect complete drainage thereof.

Mounted on the outer casing or cylinder B adjacent lower edge 8 is a reinforcing ring 15 not only adapted as a strengthening element for the cylinder body but as a ledge susceptible of being tapped with a hammer or the like to more firmly seat edge 8 in recess 9 if desired, and under which may be engaged a suitable bar or tool to effect disengagement of edge 8 from its seat, if it should become necessary. A radial slot 16 is formed in each of the corners of the base D adapted to receive one end of a respective turnbuckle rod 17 adjustably secured by nut 18. The upper ends of the rods 17 are formed with flattened portions 19 adapted to project through the rectangular slots or openings 20 formed at each of the corners of the square top plate 21 and are secured therein by pins 22 snugly fitting in openings 23 formed in flattened portions 19. If desired, pins 22 may be flattened on their under surfaces and spot welded to top plate 21. Openings 20 are adapted to align with slots 16 of bottom plate D. Rods 17 are severed intermediate their length and the meeting ends adjustably connected by respective turnbuckles 24, so that when rods 17 are engaged in slots 16, tightening of said turnbuckles securely locks said top plate 21, cylinder B and bottom plate D into a unitary structure. Top plate 21 is formed on its under surface with an annular countersunk portion 25 in which is adapted to seat the upper end of cylinder B swedged, welded, or otherwise secured therein, and to further unite and strengthen the jointure the exterior meeting edges are further soldered, welded, or the like as at 26 so as to firmly and rigidly unite said cylinder B and top plate 21.

Suitably secured to each of the respective sides of top plate 21 by screw bolts, welding, or otherwise, is an anchor plate 27 with one end extending above said plate and bent inwardly and formed with an aperture 28 adapted to suitable receive one end of a turnbuckle structure 29, the upper or meeting ends of said structures suitably secured in a ring 30 adapted to receive a hook 31 suitably secured to one end of cable 32 mounted on spaced pulleys 33 suitably supported above said device A. The free end of cable 32 is suitably connected to a counterweight 34, whereby cylinder B can be readily raised and lowered with respect to cylinder C, now to be more fully described.

The lower end of cylinder C is threadedly connected to base plate D as at 7 and is adapted to seat on a copper gasket 35 to effect an airtight and non-leakable connection, as will be well understood.

An annular top section 36 formed with a thickened central portion 37 is adapted to be mounted on the upper end of cylinder C of greater diameter than said cylinder and firmly secured thereto by welding or otherwise and with the exterior meeting edges sealed, further strengthened and united by welding, soldering or the like as at 38. The exterior wall surfaces of said cylinder C is formed with a spiral groove 39 extending substantially from its upper to its lower end and formed throughout its length with a series of spaced perforations 40 extending to the inner surface of the cylinder wall. Said groove and openings are adapted to collect and direct the filtered material into said cylinder, as will directly more fully appear.

Cylinder C is formed at its ends with thickened portions 41 and spaced therefrom with similar thickened ring portions 42 and thereby forming at each end a horizontal groove 43. A wire filter screen 44 of suitable mesh is adapted to cover the grooved surface of said cylinder, in the present instance, three laps deep, with its ends seating against the opposite portions 42 and having its seams soldered and smooth finished. The outer screen layer is adapted to be substantially flush with the surface of portions 42. A covering of suitable filtering material 45 such as paper, cloth, or the like, is superimposed on and supported by said screen, and is secured taut over said screen surface by a pair of substantially semicircular complemental steel clamping band sections 46 adapted to embrace and clamp each end of the material in a respective groove 43 when their meeting ends are connected. Each of said sections 46 has a grooved perforated anchor block 47 welded or otherwise suitably secured thereon flush with one end and a similar block 48 mounted diametrically opposite thereto. The end of each band extends beyond its block 48 and terminates in a thin edge lap extension 49 to form a slidable seat for block 47 of the opposite section 46 when the respective pairs of blocks 47—48 are adjustably connected by respective bolts 50 extending through said perforations and secured by nuts 51, said bolts drawing said sections into binding engagement with said filter material in the respective grooves 43.

It will be noted that the top plate or section 36 is spaced downwardly from top plate 21, so that chamber F extends around and above cylinder C, and similarly mounted in the outer cylinder B and communicating with chamber F at a point slightly above the upper end of cylinder C is an overflow pipe 52 for use when filling the filter with oil or other substance to be filtered, and is fitted with suitable control valve 52'. A similar pipe 53 is mounted intermediate pipe 52 and top plate 21 and is suitably fitted with a pressure gauge 53' and relief valve 53". Either of said pipes 52 or 53 may be used for applying air or steam pressure in the final drying of the filter cake if desired.

While the operation of the device would seem to be clear from the above description, it might be well to further state that base plate D having been suitably mounted on stand E, pipes 11 connected to a source of supply of the oil or liquid to be filtered and pipe 13 connected to a suitable container for the filtrate and cylinder B properly locked in position, the liquid to be filtered is forced through inlets 10 into chamber F to the level of overflow pipe 52 before valve 52' is closed. Gauge 53' indicates the pressure in said chamber so that the desired pressure may be maintained. Said pressure forces the liquid through filter material 45, screen 44, where it is collected by groove 39 and directed through perforations 40 into the filtrate chamber or cylinder C, from which it is discharged through outlet opening 12 and pipe 13 to a suitable receptacle or storage container. The flow of the liquid through the device under the desired pressure may be continuous until the filter or compression chamber is filled with the matter in suspension removed from the filtrate in the form of what may be termed filter cake. The inlets are then closed by suitable valves, not shown, and air or steam pressure is introduced through pipe 52 or 53 for effecting final drying of the cake. Turnbuckle rods 17 are then loosened and removed from slots 16, cylinder B elevated by weight 34 whereby it is removed from cylinder C permitting the expeditious removal of the filter cake and cleaning of the filter material and the device. Cylinder B is then lowered into suitable engagement with recess 9, rods 17 again placed in slots 16 and tightened by their turnbuckles, whereupon the cycle of operation may be repeated.

From the above it is apparent that we have designed a filter device, adapted to present a positive seal under high pressure, presenting a high ratio of filtering surface to lineal dimension of seal, including means for opening the device without disturbing the filtering surface thereby decreasing wear and tear on said surface and which may be readily cleaned by reversal of flow of air or steam, presenting freedom from contamination of the filtrate throughout the cycle of operation, yet one presenting simplicity of operation, simple in construction, manufacturable at a minimum of cost, and efficient for the purposes intended.

While preferably the device is operable in a vertical position, it is to be understood that the same is susceptible of use in a horizontal position if desired. Also, while the opening 12 is normally an outlet, it constitutes an inlet opening for the introduction of fluid pressure for cleaning the device.

Although in practice we have found that the form of our invention illustrated in the accompanying drawings and referred to in the above description as the preferred embodiment is the most efficient and practical, yet realizing the conditions concurrent with the adoption of our invention will necessarily vary, we desire to emphasize that various minor changes in details of construction, proportion and arrangement of parts, may be resorted to within the scope of the appended claims without departing from or sacrificing any of the principles of this invention.

Having thus described our invention, what we desire protected by Letters Patent is as set forth in the following claims.

1. A filter device for oils and the like especially adapted to withstand high pressure comprising a stationary inner cylinder and removable outer cylinder formed, respectively, with completely closed upper ends, said cylinders being so spaced as to provide an intermediate compression and filter cake chamber, said inner cylinder having circumferentially disposed filter means, a base plate having an upstanding annular centrally disposed portion adapted to threadedly engage within the inner cylinder to form a seal connection and support the cylinder in upright position, a centrally disposed outlet opening formed in said base plate, the surface of said upstanding portion being inclined downwardly from its circumferential edge to the outlet opening, an inlet opening for the compression chamber formed in said base plate exterior of the inner cylinder, said base plate having an annular V-shaped recess intermediate its circumferential edge and the inlet opening, said outer cylinder having its lower edge tapered to wedgingly seat in said V-shaped recess and effect a seal connection, adjustable securing means carried by the upper end of the outer cylinder detachably engagable with the base plate, overflow control means adapted for connection with pressure indicating means carried by said outer cylinder, whereby said outer cylinder may be expeditiously lifted and removed from the inner cylinder for effecting removal of the filter cake and cleaning purposes.

2. A filter device for oils and the like particularly adapted to withstand high pressure comprising an inner stationary filtering cylinder and a removable outer cylinder so arranged as to provide an intermediate compression chamber, said cylinders being completely closed at their upper ends and the outer cylinder tapered at its lower edge, a base plate adapted to support said cylinders and of a greater diameter than the outer cylinder, said base plate comprising a circumferential countersunk portion providing an annular upstanding portion adapted to threadedly engage the lower edge of and support in upright position the inner cylinder, inlet openings for the compression chamber and a centrally disposed outlet opening for the inner cylinder formed in said base plate, an annular circumferential V-shaped recess formed in said countersunk portion adapted to receive said tapered edge to form a seal connection, said base plate being formed with a plurality of circumferentially disposed slots, adjustable means carried by the upper end of the outer cylinder for preventing disengagement of said cylinder and base plate when pressure is applied to said compression chamber and adapted to detachably engage said slots.

3. A filter device for oils and the like adapted to withstand high pressure comprising an inner stationary cylinder and a removable outer cylinder so arranged as to provide an intermediate compression chamber, the inner chamber being completely closed at its upper end and formed on ist outer surface with a continuous spiral groove having its bottom wall perforated throughout its length, a filter material overlying said groove, the outer cylinder being tapered at its lower end and completely closed at its upper end by a top plate of substantially greater dimensions than the cylinder, a base plate of similar dimensions to said top plate having an upstanding central portion threadedly engageable in the lower end of the inner cylinder, said base plate having an annular V-shaped recess in which is adapted to seat said tapered end, said base plate being formed with inlet openings for said chamber, a centrally disposed outlet opening for the inner cylinder, and a plurality of circumferentially disposed slots, adjustable means for connecting the top and base plates carried by the top plate detachably engageable in said slots, compression chamber combined overflow outlet and steam and air inlet means carried by the upper end of the outer cylinder, means carried by the top plate by which the outer cylinder may be lifted, whereby the outer cylinder is readily removed to permit expeditious removal of the filter cake and cleaning of the cylinder filter surface.

4. A filter device for oils and the like adapted to withstand high pressure comprising an inner stationary cylinder closed at its upper end and having means for filtering and directing the filtrate to its interior, a base plate having formed in its circumferential edge detachably secured to and supporting the cylinder and formed with an annular V-shaped recess, an outer cylinder formed with a solid enlarged top plate and so telescopically arranged with respect to said inner cylinder as to form an intermediate compression chamber and having its lower edge tapered for seating and sealing engagement in said V-shaped recess, said base plate having a plurality of circumferentially arranged slots, inlet openings communicating with said chamber and an outlet opening for said inner cylinder, adjustable means carried by said top plate detachably engageable in said slots, and additional means for lifting and removing said outer cylinder from the inner cylinder.

LEWIS E. MALLORY.
JOSEPH T. NASH.